United States Patent [19]
Morita et al.

[11] Patent Number: 5,945,471
[45] Date of Patent: Aug. 31, 1999

[54] COMPOSITE CURED SILICONE POWDER AND METHOD FOR THE PREPARATION THEREOF

[75] Inventors: Yoshitsugu Morita; Atsushi Sasaki, both of Chiba Prefecture, Japan

[73] Assignee: Dow Corning Toray Silicone Co., Ltd., Tokyo, Japan

[21] Appl. No.: 08/979,014

[22] Filed: Nov. 26, 1997

Related U.S. Application Data

[63] Continuation-in-part of application No. 08/748,441, Nov. 13, 1996, Pat. No. 5,756,568.

[30] Foreign Application Priority Data

Nov. 30, 1995 [JP] Japan ................................. 7-336111
Nov. 28, 1996 [JP] Japan ................................. 8-335021

[51] Int. Cl.$^6$ ...................................................... C08K 3/22
[52] U.S. Cl. ........................ 524/409; 524/413; 524/404; 524/428; 524/431; 524/430; 524/437; 524/588; 524/492; 524/493; 523/204; 523/209; 523/220; 428/403; 428/407
[58] Field of Search ...................................... 523/204, 209, 523/220; 524/588, 409, 413, 404, 428, 431, 430, 437, 492, 493; 428/403, 407

[56] References Cited

U.S. PATENT DOCUMENTS

| | | | |
|---|---|---|---|
| 4,594,134 | 6/1986 | Hanada et al. | 522/99 |
| 4,742,142 | 5/1988 | Shimizu et al. | 528/15 |
| 4,743,670 | 5/1988 | Yoshida et al. | 528/15 |
| 5,387,624 | 2/1995 | Morita et al. | 523/220 |

FOREIGN PATENT DOCUMENTS

| | | |
|---|---|---|
| 0 304 946 | 1/1989 | European Pat. Off. . |
| 0 350 519 | 1/1990 | European Pat. Off. . |
| 0 516 057 | 12/1992 | European Pat. Off. . |
| 0 647 672 | 4/1995 | European Pat. Off. . |

*Primary Examiner*—Margaret W. Glass
*Attorney, Agent, or Firm*—Alex Weitz

[57] ABSTRACT

There is disclosed a composite powder composition which has excellent flowability and water repellency and finds utility as a modifier for paints and organic resins, said composition comprising:

(A) 100 parts by weight of a cured silicone powder that has an average particle size of 0.1 to 500 micrometers and contains 0.5 to 80 weight percent of a non-crosslinking oil; and (B) 0.1 to 100 parts by weight of a microfine inorganic powder, said inorganic powder being coated on the surface of said cured silicone powder.

10 Claims, No Drawings

COMPOSITE CURED SILICONE POWDER AND METHOD FOR THE PREPARATION THEREOF

This application is a continuation-in-part of Ser. No. 08/748,441, filed Nov. 13, 1996, U.S. Pat. No. 5,756,568.

FIELD OF THE INVENTION

This invention relates to composite cured silicone powders comprising cured silicone powder whose surface is coated with microfine inorganic powder and to methods for the preparation thereof. More particularly, this invention relates to a very flowable and strongly water repellent composite cured silicone powder and to a method for the preparation of this composite cured silicone powder.

BACKGROUND OF THE INVENTION

Cured silicone powders are used as additives in, for example, cosmetics, paints, inks, thermosetting organic resins, and thermoplastic organic resins. Cured silicone powders are particularly well suited for use as internal stress relaxers for thermosetting organic resins and as surface lubricants for organic resin films.

Cured silicone powders can be produced, for example, by grinding silicone rubber, by curing a liquid silicone rubber composition while spray drying (refer to Japanese Patent Application Laid Open Number Sho 59-68333 (68,333/1984), and by curing a liquid silicone rubber composition while it is dispersed in water (refer to Japanese Patent Application Laid Open Numbers Sho 62-243621, Sho 63-77942, Sho 63-202658, and Sho 64-70558. However, the cured silicone powders afforded by these methods have a strong tendency to aggregate and, as a result, have a poor flowability. Further, they cannot be uniformly dispersed in organic resins, e.g., thermosetting organic resins and thermoplastic organic resins.

Composite cured silicone powders with an improved flowability have been proposed in order to solve these problems. These composite cured silicone powders comprise cured silicone powder whose surface has been coated with a microfine inorganic powder (refer to Japanese Patent Application Laid Open Numbers Hei 4-348143, Hei 5-179144, and Hei 7-102075). These composite cured silicone powders, however, exhibit a poor water repellency and thus have a poor affinity for organic resins in those applications where they are blended with organic resins.

SUMMARY OF THE INVENTION

The object of the present invention is to provide a very flowable and highly water repellent composite cured silicone powder and a method for the preparation of this composite cured silicone powder.

The composite cured silicone powder according to the present invention characteristically comprises cured silicone powder that has an average particle size from 0.1 to 500 micrometers and contains a non-crosslinking oil, the surface of said silicone powder being coated with a microfine inorganic powder.

In addition, the method for the preparation of the composite cured silicone powder according to the present invention comprises mixing cured silicone powder that has an average particle size from 0.1 to 500 micrometers and contains the non-crosslinking oil with a microfine inorganic powder under mechanical shear.

DETAILED DESCRIPTION OF THE INVENTION

The composite cured silicone powder according to the present invention is a cured silicone powder whose surface has been coated with a microfine inorganic powder. The average particle size of the cured silicone powder should be from about 0.1 to about 500 micrometers, preferably 0.1 to about 200 micrometers. Coating the surface of cured silicone powder with a microfine inorganic powder becomes highly problematic when the average particle size of the cured silicone powder is below about 0.1 micrometer. On the other hand, composite cured silicone powder prepared from cured silicone powder having an average particle size above about 500 micrometers is not readily dispersible in organic resins. The cured silicone powder can be, for example, a silicone gel powder, silicone rubber powder, or silicone resin powder, wherein silicone rubber powder being particularly preferred. The cured silicone powder can be prepared by curing reactions based on, for example, addition reaction, condensation reaction, reaction promoted by an organoperoxide, reaction promoted by ultraviolet radiation, and the like. Particularly preferred are cured silicone powders prepared by curing through addition reaction or condensation reaction. The physical properties of the cured silicone powder are not critical, but the JIS (Japanese Industrial Standard) A durometer hardness preferably does not exceed 90, preferably less than 50, when the cured silicone powder is a silicone rubber powder.

The non-crosslinking oil is an oil that is contained in the cured silicone powder and naturally exudes from the powder or can be extracted therefrom with an organic solvent. Such oils are exemplified by non-crosslinking silicone oils and non-crosslinking organic oils.

The silicone oils are silicone oils that do not take part of the curing reaction used in the preparation of the cured silicone powder. A straight chain structure, a straight chain structure with partial branching, a ring-shaped structure, or a branched chain structure are suitable structures, among which the straight-chain structure is particularly preferred. Dimethylpolysiloxanes having both ends of the molecular chain blocked with trimethylsiloxy groups, polysiloxanes obtained by substituting alkyl groups other than methyl, as well as phenyl groups and 3,3,3-trifluoropropyl groups, for some of the methyl groups of such dimethylpolysiloxanes, and other non-reactive silicone oils are representative of such silicone oils. Further, when the non-crosslinking silicone oil is introduced in advance in the curable silicone compositions, for which the reaction used to form the cured silicone powders is an addition reaction, the following oils can be used: dimethylpolysiloxznes having both ends of the molecular chain blocked with silanol groups, polysiloxanes obtained by substituting alkyl groups other than methyl, as well as phenyl groups and 3,3,3-trifluoropropyl groups, for some of the methyl groups of such dimethylpolysiloxanes, dimethylpolysiloxanes having both ends of the molecular chain blocked with dimethylvinylsiloxy groups that could take part in the addition reaction but remained unreacted, dimethylsiloxane-methylvinylsiloxane copolymers having both ends of the molecular chain blocked with trimethylsiloxy groups, dimethylpolysiloxanes having both ends of the molecular chain blocked with unreacted dimethylhydridosiloxy groups, unreacted dimethylsiloxane-methylhydridosiloxane copolymers having both ends of the molecular chain blocked with trimethylsiloxy groups, polysiloxanes obtained by substituting alkyl groups other than methyl, as well as phenyl groups and 3,3,3-trifluoropropyl groups, for some of the methyl groups of these polysiloxanes, inter alia. When the non-crosslinking silicone oils are introduced in advance in curable silicone compositions for which the reaction used to form the cured silicone powders is a condensation reaction, the following oils can be used: polysiloxanes obtained by substituting alkenyl groups for some of the methyl groups of the non-reactive oils, dimethylpolysiloxanes with both ends of the molecular chain blocked with silanol groups that could take part in the addition reaction but remained unreacted, and silicone oils obtained by substituting alkyl groups other than methyl, as well as alkenyl groups, phenyl groups, and 3,3,3-trifluoropropyl groups, for some of the methyl groups of these polysiloxanes, inter alia. In addition, when the cured silicone powders are impregnated with non-crosslinking silicone oils subsequent to being cured, there are no particular limitations concerning these silicone oils.

Non-crosslinking organic oils of the present invention are exemplified by liquid paraffin, mineral oil, polyisobutyelene, hexyl laurate, isopropyl myristate, myristyl myristate, cetyl myristate, 2-octyldodecyl myristate, isopropyl palmitate, 2-ethylhexyl palmitate, butyl stearate, decyl oleate, 2-octyldodecyl oleate, myristyl lactate, cetyl lactate, lanolin acetate, stearyl alcohol, cetostearyl alcohol, oleyl alcohol, avocado oil, almond oil, olive oil, rape seed oil, corn oil, cacao oil, jujube oil, sesame oil, safflower oil, soybean oil, tsubaki oil, squalane, persic oil, castor oil, mink oil, cottonseed oil, soybean oil, sardine oil, coconut oil, egg yolk oil, beef tallow, pork tallow, polypropylene glycol monooleate, neopentyl glycol-2-ethylhexanoate, and other glycol ester oils; triglyceride isostearate, triglyceride salts of coconut oil fatty acids and other polyhydric alcohol ester oils; polyoxyethylene lauryl ether, polyoxypropylene cetyl ether, and other polyoxyalkylene ether oils, inter alia. These organic oils can also be introduced into the curable silicone compositions before cure or the cured silicone powders can be impregnated therewith.

These non-crosslinking oils are liquids having a viscosity at 25° C., for example, within the range of from 1 to 100,000 centipoise, preferably 5 to 50,000 centipoise, and most preferably 5 to 10,000 centipoise. This is due to the fact that oils having a viscosity below this range are volatile and tend to present difficulties in terms of imparting durable water repellency to the resultant composite cured silicone powders. On the other hand, oils having a viscosity exceeding about 100,000 cP tend to present difficulties in terms of molding cured silicone powders having an average particle diameter of 500 $\mu$m or less. The above mentioned silicone oils are preferable as such non-crosslinking oils from the standpoint of their superior affinity for cured silicone powders and the ability to impart durable water repellency to composite cured silicone powders.

For the purposes of the present invention, the amount of the non-crosslinking oils contained in the cured silicone powders is, preferably, 0.5 wt % to 80 wt %, and, particularly preferably, 10 wt % to 50 wt %. This is due to the fact that when the amount of the non-crosslinking oils contained in the cured silicone powders is lower than about 0.5%, imparting sufficient water repellency to the resultant composite cured silicone powders tends to become more difficult. On the other hand, when this amount exceeds about 80%, the mechanical strength of the cured silicone powders decreases, and the non-crosslinking oils tend to exude from the resultant composite cured silicone powders even under normal conditions.

The following methods may be used in the preparation of cured silicone powders containing the non-crosslinking oils:

(1) curing an addition-curable silicone composition wherein an organopolysiloxane having at least two alkenyl groups in one molecule is reacted with an organopolysiloxane having at least two hydrogen atoms bonded to a silicon atom in one molecule in the presence of a non-crosslinking oil and a platinum compound;

(2) curing a condensation-curable silicone composition wherein an organopolysiloxane having at least two hydroxyl groups, alkoxy groups, oxime groups, acetoxy groups, aminoxy groups or other hydrolyzable groups bonded to silicon in one molecule is reacted with an appropriate silane cross-linking agent having at least three alkoxy groups, oxime groups, acetoxy groups, aminoxy groups or other hydrolyzable groups bonded to a silicon atom in one molecule, in the presence of a non-crosslinking oil and an organotin compound, an organotitanium compound, or another suitable condensation reaction catalyst;

(3) curing a peroxide-curable silicone composition wherein a diorganopolysiloxane having at least one alkenyl group in one molecule is cured in the presence of a non-crosslinking oil and an organic peroxide and subsequently grinding the cured product into a powder by using a grinder;

(4) the above methods wherein curable silicone compositions are cured by spraying using a spray drier or other atomizing equipment; and (5) the above methods wherein curable silicone compositions are cured by dispersing them in water or aqueous dispersions of surface active agents, all of the above curing methods being well known in the art.

Among the methods used for preparing these cured silicone powders, the method in which these curable silicone compositions are cured by dispersing them in water or aqueous dispersions of surface active agents is particularly preferable from the standpoint that it results in globular (spherical) cured silicone powders of superior dispersibility in organic resins. Generally speaking, cured silicone powders that are prepared in water have surface active agents adhered thereto and do not contain non-crosslinking oils are hydrophilic and it is difficult to impart water repellency to them even by coating their surface with inorganic micropowders. In the case of the composite cured silicone powders of the present invention, however, significant water repellency can be imparted to the resultant composite cured silicone powders by using cured silicone powders containing non-crosslinking oils.

In order to prepare water-based dispersions of the curable silicone compositions, it is possible to use, for example, homogenizers, colloid mills and other stirring equipment, as well as ultrasonic vibrators and other mixing equipment. At such time, prior to preparing the water-based dispersions by using these curable silicone compositions, it is preferable to adjust the cure rate of these curable silicone compositions by cooling them in advance. Also, in order to stabilize these curable silicone compositions in terms of particle shape, it is preferable to use aqueous dispersions of surface active agents in the water-based systems. The amount of the added surface active agents is preferably 0.1 to 20 parts by weight, and particularly preferably, 0.5 to 10 parts by weight per 100 parts by weight of the curable silicone composition. Also, the amount of the added water is preferably 40 to 2000 parts by weight, and particularly preferably, 40 to 1000 parts by weight per 100 parts by weight of the curable silicone composition. This is due to the fact that when the amount of the added water is less than about 40 parts by weight per 100 parts by weight of the curable silicone composition, a homogeneous water-based dispersion of the curable silicone composition is difficult to prepare, and when it exceeds about 2000 parts by weight, the characteristics of the cured silicone powder that are important for industrial production markedly deteriorate. Also, from the standpoint of the relative difficulty of stabilizing the water-based dispersions of the curable silicone compositions, it is preferable to use ion-exchange water with a small amount of metal ions and halogen ions and an electric conductivity of 1 µS/cm or lower, and it is particularly preferable if it has an electric conductivity of not more than 0.5 µS/cm.

Next, water-based dispersions of cured silicone powder can be prepared by curing the curable silicone composition in the water-based dispersions by allowing the water-based dispersions of the curable silicone compositions prepared in the manner described above to stand, with heating or at room temperature. In the case in which the water-based dispersions of the curable silicone compositions are heated, it is preferable if the heating temperature is not higher than 100° C., particularly 10° C. and 95° C. A method, in which a water-based dispersion is heated directly, or a method in which a water-based dispersion is added to hot water, are suggested as examples of the methods used for heating the water-based dispersion, of the curable silicone compositions. Next, cured silicone powders can be prepared by removing water from the water-based dispersions of the curable silicone powders. Vacuum driers, hot-air ovens, spray driers and the like are suggested as examples of the methods used for removing water from water-based dispersions of the cured silicone powders.

The following materials are illustrative of suitable inorganic maicropowders according to the present invention: silicon oxide, titanium oxide, aluminum oxide, zirconium oxide, antimony oxide and other metal oxide micropowders; boron nitride, aluminum nitride, and other metal nitride micropowders; sulfate micropowders, chloride micropowders, and the like. These micropowders are used to coat the surface of the cured silicone powders, the metal oxide micropowders being particularly preferred. Also, micropowders obtained by subjecting the surface of these inorganic micropowders to hydrophobic treatment with organoalkoxysilane, organochlorosilane, organosilazane and other organosilicon compounds can also be used.

The particle diameter of the inorganic micropowders should be a particle diameter sufficient for coating the surface of the cured silicone powder, specifically, it is preferable that the particle diameter should be not higher than 1/10 of the average particle diameter of the cured silicone powders. It is preferable for their specific surface area to be not less than 10 m²/g.

The manufacturing method of the present invention is characterized by the fact that a cured silicone powder, which has an average particle diameter of 0.1 to 500 µm and contains a non-crosslinking oil, is mixed with an inorganic micropowder by applying mechanical shear. A Henschel™ mixer, a super mixer, and the like, are suggested as examples of the devices used for mixing these powders by applying mechanical shear. Also, there are no particular limitations regarding the temperature used for mixing these powders; for example, mixing can be conducted at room temperature. Also, because cured silicone powders, which lack flowability, start to exhibit flowability when their surface is coated with inorganic micropowders, the duration of mixing has to be appropriately determined by observing changes in this property.

In accordance with the manufacturing method of the present invention, the amount of the added inorganic micropowders should be sufficient to coat the surface of the cured silicone powders, and although it depends on the amount of the non-crosslinking oil contained in the cured silicone powders, generally speaking, it is preferable for their amount to be between 0.1 and 100 parts by weight, preferably 1 to 50 parts by weight, per 100 parts by weight of the cured silicone powder.

Because the composite cured silicone powder of the present invention possesses superior flowability and water repellency, and therefore has superior affinity and dispersibility in organic compounds and organic resins, it can be used as an additive or a modifier for coating materials, organic resins, and the like.

EXAMPLES

Detailed explanations regarding the composite cured silicone powder of the present invention and its manufacturing method will be now provided by referring to application examples. In addition, the term "viscosity" used in the application examples designates a viscosity value measured at a temperature of 25° C. Also, the characteristics of the cured silicone powders and the composite cured silicone powders were measured in the following manner.

JIS A hardness of cured silicone powder

Curable silicone compositions were cured in sheet form and their hardness was measured by using a JIS A hardness tester conforming to JIS K 6 301.

Content of non-crosslinking oil in cured silicone powder

A dispersion was prepared by adding 1000 g of toluene to 100 g of cured silicone powder, and, upon subjecting the dispersion to agitation using an agitator (e.g., a homogenizer) at 1000 rpm for 10 minutes and then at 500 rpm for another 10 minutes, it was allowed to stand at room temperature for 12 hours. After that, the dispersion was again subjected to agitation at 500 rpm for 10 minutes using a homogenizer. The dispersion was filtered through filter paper and the filtrate was collected. Then, a dispersion was prepared by adding 750 g of toluene to the cured silicone powder remaining on the filter paper, and this dispersion was subjected to agitation at 1000 rpm for 10 minutes using a homogenizer. The dispersion was filtered through filter paper and the filtrate was collected. After adding this filtrate to the previously obtained filtrate, toluene was removed therefrom by using an evaporator maintained at a temperature of 80° C. and a pressure of 70 mmHg. The viscosity and weight of the resultant oil were measured. Also, the components of this oil were determined by subjecting the oil to proton nuclear magnetic spectroscopy, gel permeation chromatography, and infrared spectroscopic analysis.

Average particle diameter of the cured silicone powder

The average particle diameter of the cured silicone powders was measured by using image processing equipment connected to an optical microscope.

Flowability of the cured silicone powder or composite cured silicone powder

The flowability of the cured silicone powders, or the composite cured silicone powders, was evaluated based on the wt % of these powders as measured by using a 100-mesh air-jet sieve (sieve opening=150 µm) manufactured by Alpine Co.

Water repellency of the cured silicone powder or composite cured silicone powder One gram of a cured silicone powder or a composite cured silicone powder was added to 100 mL of water and mixed therewith using an agitator. A cured silicone powder or a composite cured silicone powder that did not mix with water and floated on the surface was considered to be water repellent and designated with (O), whereas a powder that did mix and sank was considered to be hydrophilic and designated with (x).

REFERENCE EXAMPLE 1

A composition (I) was prepared by homogeneously mixing 28 parts by weight of dimethylpolysiloxane having both ends of the molecular chain blocked with dimethylvinylsiloxy groups (vinyl group equivalent=8000), 7 parts by weight of dimethylsiloxane-methylhydridosiloxane copolymer with a viscosity of 20 centipoise represented by the formmula:

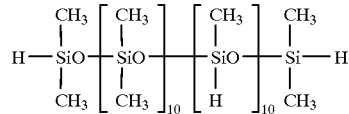

wherein both ends of the molecular chain were blocked with dimethylhydridosiloxy groups, and 15 parts by weight of dimethylpolysiloxane with a viscosity of 100 centipoise, in which both ends of the molecular chain were blocked with trimethylsiloxy groups.

Also, a composition (II) was prepared by homogeneously mixing 33 parts by weight of the above mentioned dimethylpolysiloxane having both ends of the molecular chain blocked with dimethylvinylsiloxy groups, 16 parts by weight of dimethylpolysiloxarte with a viscosity of 100 centipoise having both ends of the molecular chain blocked with trimethylsiloxy groups, and an isopropanol solution of chloroplatinic acid (in such an amount that, in weight units as converted to platinum metal, its amount constituted 20 ppm per 100 parts by weight of the above mentioned dimethylpolysiloxane having both ends of the molecular chain blocked with dimethylvinylsiloxy groups).

Next, a silicone rubber composition was prepared by homogeneously mixing the entire amount of the above described composition (I) and composition (II) at a temperature of 5° C., whereupon it was quickly mixed with an aqueous dispersion made up of 200 parts by weight of demineralized water at 25° C. (electric conductivity=0.2 $\mu$S/cm) and 4 parts by weight of polyoxyethylenenonylphenyl ether (HLB=13.1) by using a homogenizer (300 kgf/cm$^2$), thus preparing a homogenous water-based emulsion of the silicone rubber composition. A water-based dispersion of a silicone rubber powder was then prepared by means of curing the silicone rubber composition by allowing the water-based emulsion of the silicone rubber composition to stand for 6 hours at a temperature of 30° C. After heating the water-based dispersion of the silicone rubber powder for 1 hour at a temperature of 80° C., a globular silicone rubber powder (A) with an average particle diameter of 5 $\mu$m was prepared by drying it using a spray drier. Silicone rubber powder (A) had a JIS A hardness of 20 and contained .30 wt % of a non-crosslinking oil having a viscosity of 100 centipoise and consisting of dimethylpolysiloxane having both ends of the molecular chain blocked with trimethylsiloxy groups. The characteristics of silicone rubber powder (A) are indicated in Table 1.

REFERENCE EXAMPLE 2

A composition (III) was prepared by homogeneously mixing 20 parts by weight of dimethylpolysiloxane having both ends of the molecular chain blocked with dimethylvinylsiloxy groups (vinyl group equivalent=4000), 1 1 parts by weight of dimethylsiloxane-methylhydridosiloxane copolymer with a viscosity of 20 centipoise represented by the formula:

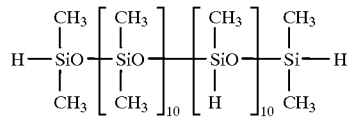

wherein both ends of the molecular chain were blocked with dimethylhydridosiloxy groups, and 30 parts by weight of dimethylpolysiloxane with a viscosity of 300 centipoise, in which both ends of the molecular chain were blocked with trimethylsiloxy groups.

Also, a composition (IV) was prepared by homogeneously mixing 50 parts by weight of the above mentioned dimethylpolysiloxane having both ends of the molecular chain blocked with dimethylvinylsiloxy groups and an isopropanol solution of chloroplatinic acid (in such an amount that, in weight units as converted to platinum metal, its amount constituted 20 ppm per 100 parts by weight of the above mentioned dimethylpolysiloxane having both ends of the molecular chain blocked with dimethylvinylsiloxy groups).

Next, a silicone rubber composition was prepared by homogeneously mixing the entire amount of the above described composition (III) and composition (IV) at a temperature of 5° C., whereupon it was quickly mixed with an aqueous dispersion made up of 200 parts by weight of demineralized water at 25° C. (electric conductivity=0.2 $\mu$S/cm) and 4 parts by weight of polyoxyethylenenonylphenyl ether (HLB=13.1) by using a homogenizer (300 kgf/cm$^2$), thus preparing a homogenous water-based emulsion of the silicone rubber composition. A water-based dispersion of a silicone rubber powder was then prepared by means of curing the silicone rubber composition by allowing the water-based emulsion of the silicone rubber composition to stand for 6 hours at a temperature of 30° C. After that, by heating the water-based dispersion of the silicone rubber powder for 1 hour at a temperature of 80° C., a globular silicone rubber powder (B) with an average particle diameter of 4 $\mu$m was prepared by drying it in an oven at a temperature of 120° C. The silicone rubber powder (B) had a JIS A hardness of 25 and contained 28 wt % of non-crosslinking oil having a viscosity of 300 centipoise consisting of dimethylpolysiloxane having both ends of the molecular chain blocked with trimethylsiloxy groups. The characteristics of silicone rubber powder (B) are indicated in Table 1.

REFERENCE EXAMPLE 3

A composition (V) was prepared by homogeneously mixing 28 parts by weight of dimethylpolysiloxane having both ends of the molecular chain blocked with dimethylvinylsiloxy groups (vinyl group equivalent=8000) and 7 parts by weight of dimethylsiloxane-methylhydridosiloxane copolymer with a viscosity of 20 centipoise represented by the formula:

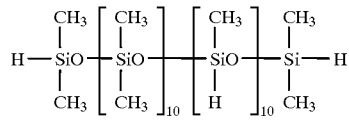

wherein both ends of the molecular chain were blocked with dimethylhydridosiloxy groups.

Also, composition (VI) was prepared by homogeneously mixing 33 parts by weight of the above mentioned dimethylpolysiloxane having both ends of the molecular chain blocked with dimethylvinylsiloxy groups and an isopropanol solution of chloroplatinic acid (in such an amount that in weight units, as converted to platinum metal, its amount constituted 20 ppm per 100 parts by weight of the above mentioned dimethylpolysiloxane having both ends of the molecular chain blocked with dimethylvinylsiloxy groups).

Next, a silicone rubber composition was prepared by homogeneously mixing the entire amount of the above described composition (V) and composition (VI) at a temperature of 5° C., whereupon it was quickly mixed with an aqueous dispersion made up of 200 parts by weight of demineralized water at 25° C. (electric conductivity=0.2 PS/cm) and 4 parts by weight of polyoxyethylenenonylphenyl ether (HLB=13.1) by using a homogenizer (300 kgf/cm$^2$), thus preparing a homogenous water-based emulsion of the silicone rubber composition. A water-based dispersion of a silicone rubber powder was then prepared by means of curing the silicone rubber composition by allowing the water-based emulsion of the silicone rubber composition to stand for 6 hours at a temperature of 30° C. After heating the water-based dispersion of the silicone rubber powder for 1 hour at a temperature of 80° C., a globular silicone rubber powder (C) with an average particle diameter of 5 μm was prepared by drying it using a spray drier. The JIS A hardness of silicone rubber powder (C) was 40 and it did not contain non-crosslinking oil, as determined by washing with toluene. The characteristics of silicone rubber powder (C) are indicated in Table 1.

APPLICATION EXAMPLE 1

A composite silicone rubber powder (D), whose surface was coated with a micropowder of amorphous silica, was prepared by mixing 100 parts by weight of silicone rubber powder (A) prepared in Reference Example 1 and 4 parts by weight of amorphous silica micropowder (specific surface area=130 m$^2$/g) for 20 minutes at 2000 rpm using a Henschel™ mixer. The characteristics of composite silicone powder (D) are indicated in Table 1.

APPLICATION EXAMPLE 2

A composite silicone rubber powder (E), whose surface was coated with a micropowder of hydrophobic titanium oxide, was prepared by mixing 100 parts by weight of silicone rubber powder (A) prepared in Reference Example 1 and 8 parts by weight of a hydrophobic titanium oxide micropowder, whose surface had been treated with hexamethyldisilazane (particle diameter =0.03~0.05 μm, specific surface area=30~40 m$^2$/g) for 20 minutes at 2000 rpm using a Henschel™ mixer. The characteristics of composite silicone powder (E) are indicated in Table 1.

APPLICATION EXAMPLE 3

A composite silicone rubber powder (F), whose surface was coated with a micropowder of amorphous silica, was prepared by mixing 100 parts by weight of silicone rubber powder (B) prepared in Reference Example 2 and 4 parts by weight of amorphous silica micropowder (specific surface area=130 m$^2$/g) for 20 minutes at 2000 rpm using a Henschel™ mixer. The characteristics of composite silicone powder (F) are indicated in Table 1.

COMPARISON EXAMPLE 1

A composite silicone rubber powder (G), whose surface was coated with a micropowder of amorphous silica, was prepared by mixing 100 parts by weight of silicone rubber powder (C) prepared in Reference Example 3 and 4 parts by weight of amorphous silica micropowder (specific surface area=130 m$^2$/g) for 20 minutes at 2000 rpm using a Henschel™ mixer. The characteristics of composite silicone powder (G) are indicated in Table 1.

COMPARISON EXAMPLE 2

A composite silicone rubber powder (H), whose surface was coated with a micropowder of hydrophobic amorphous silica, was prepared by mixing 100 parts by weight of silicone rubber powder (C) prepared in Reference Example 3 and 5 parts by weight of hydrophobic amorphous silica micropowder, whose surface had been treated with dimethyldichlorosilane (surface density of silanol groups=1.2 groups/100 Å$^2$, primary particle diameter=16 μm, specific surface area=120 m$^2$/g), for 20 minutes at 2000 rpm using a Henschel™ mixer. The characteristics of composite silicone powder (H) are indicated in Table 1.

TABLE 1

|  | Reference Examples | | | Present Invention | | | Comparison Examples | |
|---|---|---|---|---|---|---|---|---|
| Silicone rubber powder | A | B | C | | | | | |
| Composite silicone rubber powder | | | | D | E | F | G | H |
| Average particle diameter (μm) | 5 | 4 | 5 | 5 | 5 | 4 | 5 | 5 |
| Flowability Mesh on (wt %) | >95 | >95 | >95 | <5 | <5 | <5 | <5 | <5 |
| Water repellency | x | x | x | ○ | ○ | ○ | x | x |

From Table 1 it can be seen that the composite cured silicone powder of the present invention is characterized by superior water repellency relative to a system which does not contain the non-crosslinking oil. Also, the manufacturing method of the present invention is characterized by permitting the manufacture of such a composite cured silicone powder.

That which is claimed is:

1. A composition comprising:

(A) 100 parts by weight of a cured silicone powder that has an average particle size of 0.1 to 500 micrometers and contains 0.5 to 80 weight percent of a non-crosslinking organic oil; and (B) 0.1 to 100 parts by weight of a microfine inorganic powder, said inorganic powder being coated on the surface of said cured silicone powder.

2. The composition according to claim 1, wherein said microfine inorganic powder is a metal oxide.

3. The composition according to claim 2, wherein said microfine inorganic powder has a specific surface of at least 10 m$^2$/g.

4. The composition according to claim 1, wherein said cured silicone powder is silicone rubber powder.

5. The composition according to claim 4, wherein said silicone rubber is polydimethylsiloxane and said non-crosslinking oil is selected from the group consisting of a liquid paraffin oil, a mineral oil and a polyisobutyelene oil.

6. The composition according to claim 5, wherein said silicone rubber is cured by an addition reaction.

7. A method for preparing a composite cured silicone powder, said method comprising mixing (A) a cured silicone powder that has an average particle size of 0.1 to 500 micrometers and contains a non-crosslinking organic oil with (B) a microfine inorganic powder, whereby said inorganic powder is coated on the surface of said cured silicone powder.

8. The method according to claim 7, wherein said cured silicone powder is a polydimethylsiloxane rubber.

9. The method according to claim 8, wherein said non-crosslinking oil is selected from the group consisting of a liquid paraffin oil, a mineral oil and a polyisobutyelene oil.

10. The method according to claim 9, wherein said polydimethylsiloxane rubber is cured by an addition reaction.

* * * * *